FIVE LAYER AND JUNCTION BRIDGING TERMINAL SWITCHING DEVICE

Filed Sept. 8, 1959

4 Sheets-Sheet 1

INVENTORS:
NICK HOLONYAK, JR.
RICHARD W. ALDRICH,

BY Julius J. Zaskalicky
THEIR ATTORNEY.

INVENTORS:
NICK HOLONYAK, JR.
RICHARD W. ALDRICH,
BY Julius J. Zaskalicky
THEIR ATTORNEY.

INVENTORS:
NICK HOLONYAK, JR.
RICHARD W. ALDRICH,
BY Julius J. Zaskalicky
THEIR ATTORNEY.

INVENTORS:
NICK HOLONYAK, JR,
RICHARD W. ALDRICH,

BY Julius J. Zaskalicky
THEIR ATTORNEY.

United States Patent Office 3,476,993
Patented Nov. 4, 1969

3,476,993

FIVE LAYER AND JUNCTION BRIDGING TERMINAL SWITCHING DEVICE

Richard W. Aldrich, Liverpool, and Nick Holonyak, Jr., Syracuse, N.Y., assignors to General Electric Company, a corporation of New York Filed Sept. 8, 1959, Ser. No. 838,504
Int. Cl. H01l *11/00, 5/00*
U.S. Cl. 317—235 20 Claims

ABSTRACT OF THE DISCLOSURE

Semiconductor devices having improved switching capabilities are disclosed. Five layer devices formed of successive layers of P and N type conductivity are disclosed. Multilayer switching devices with and without control leads are shown provided with a terminal bridging the junction of adjacent layers of opposite conductivity type. One or both main current carrying terminals of the devices may be so constructed.

The present invention relates, in general, to semiconductor devices and, in particular, to improvements in semiconductor devices of the multi-layer type having switch-like characteristics.

Such devices are described in an article by Moll, Tanenbaum, Goldey and Holonyak in Proceedings of the IRE, September 1956, volume 44, pages 1174–1182. One version of such prior art devices comprises a body of semiconductor material having four distinct layers with adjacent layers being of opposite conductivity type to form a plurality of P-N junctions and having an electrical terminal on each of the outside layers. When one terminal is biased in one polarity with respect to the other terminal, the two P-N junctions nearest the terminals become reversely biased and the center P-N junction becomes forwardly biased; thus a high impedance is presented between the terminals. If a sufficiently large potential is applied between the terminals, the two P-N junctions nearest the terminals break down and conduct current in the reverse direction. When the one terminal is biased in the other polarity with respect to the other terminal, the two P-N junctions nearest the terminals become forwardly biased and the center P-N junction becomes reversely biased; thus a high impedance is again presented between the terminals. However, if the potential applied between the terminals is increased, eventually not only does the center P-N junction break down, but reverses in polarization and a very low impedance is presented between the terminals. As set forth in the IRE article mentioned above, two requirements which must be fulfilled in order to obtain the reversal in polarity of the center P-N junction and hence conduction thereacross are (1) that one of the two transistor sections into which the device is resolvable, an NPN and a PNP transistor section with the center junction being the collector junction of both transistor sections, have a current gain, alpha, which increases with current, and (2) that the sum of the current gains of the two transistor sections be equal or greater than unity at some intermediate current. In the arrangements disclosed in the IRE article, the variable current gain requirement is inherent in silicon structures used. Sufficient current is passed by the center junction as a result of leakage or avalanche effects to enable the second requirement to be met.

The present invention is directed to the provision of novel structures for obtaining the variation in current gain with current requirement of such devices as well as to the provision of novel devices utilizing such structures.

It is an object of the present invention to provide semiconductor devices of improved characteristics.

It is another object of the present invention to provide devices of switch-type characteristics which are stable and relatively insensitive to temperature effects.

It is still another object of the present invention to provide novel structures for obtaining greater flexibility, simplicity and reliability in the design and operation of multilayer switch-type devices.

It is a further object of the present invention to provide novel four-layer devices having novel current versus voltage characteristics.

It is a still further object of the present invention to provide novel five-layer devices of heretofore desirable but unattainable characteristics.

In carrying out the present invention in one illustrative form thereof, a body of semiconductor material including a region of one conductivity type having therein a surface adjacent region of the opposite conductivity type to form with the body a P-N junction is provided. Two electrodes are also provided, one electrode making low resistance ohmic contact with the surfaces of said regions adjacent said junction, and the other electrode in conductive relation with a surface of said region of one conductivity type remote from said junction. Said regions and said electrodes being proportioned and oriented such that when a potential of proper polarity is applied between said electrodes, current flows from one electrode to the other along a path which has a component generally parallel to a portion of said junction remote from the surface of said one electrode, thereby biasing that portion of said junction in the forward direction to cause carriers in majority in said region of opposite conductivity type to be injected into said region of one conductivity type.

Further objects and advantages of the present invention will be more clearly understood by reference to the following description taken in connection with the accompanying drawings and its scope will be apparent in the appended claims.

Figure 1:
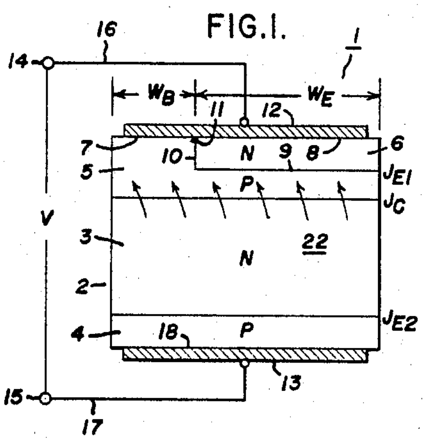
FIGURE 1 shows a sectional view of a four-layer two-electrode switching device in accordance with the present invention.

Referring now in particular to FIGURE 1, there is shown a cross-section view of an illustrative embodiment of the present invention. FIGURE 1 shows a semiconductor device 1 comprising a body of semiconductor material 2 having four layers or regions therein, an N-type conductivity intermediate region 3, a P-type conductivity external region 4 adjacent thereto, another P-type conductivity intermediate region 5 adjacent thereto, and an N-type conductivity external region 6 adjacent the P-type intermediate region 5. These regions meet to form three generally parallel P-N junctions $J_C$, $J_{E1}$ and $J_{E2}$. $J_C$ is referred to as the collector or center junction and is formed between the N-type region 3 and P-type region 5. $J_{E1}$ is referred to as the first emitter junction, and is formed between P-type layer 5 and N-type layer 6. $J_{E2}$ is referred to as the second emitter junction and is formed between N-type layer 3 and P-type layer 4. The intermediate P-type region 5 surrounds the N-type region 6 on two sides and has a surface 7 coplanar with the outside surface 8 of region 6. The junction $J_{E1}$ has a substantial portion generally parallel to a surface 8 and a portion of lesser extent 10 generally perpendicular to and meeting with external surfaces 7 and 8 of regions 6 and 5, respectively.

The body 2 has a pair of opposed surfaces generally parallel to the collection junction $J_C$. One opposed surface 18 comprises the external surface of the P-type region 4 and the other comprises the external surface 8 of the N-type region 6 and external surface 7 of intermediate P-type region 5 coplanar therewith. An electrode 12 is secured in good conductive contact to the external surfaces 7 and 8 and another electrode 13 is secured in good conductive contact to the external surface 18. The electrode 12 spans and short-circuits the junction $J_{E1}$ along a line whose projection perpendicular to the plane of the drawing is point 11. Conductors 12 and 13 are connected to external terminals 14 and 15 by leads 16 and 17, respectively.

The operation of the device of FIGURE 1 will be explained by reference to FIGURE 2 which shows a graph of the voltage versus current characteristic of the device of FIGURE 1. In the graph the current flow between leads 14 and 15 is represented as the ordinate and the voltage applied across the leads is represented as the abscissa. Assume that an increasing voltage is applied so as to render electrode 12 increasingly positive with respect to electrode 13. Junction $J_{E1}$ tends to become, and $J_{E2}$ becomes reversely biased, and thus blocks current flow thereacross. The collector junction $J_C$ is forwardly biased. Thus a high impedance is presented across electrodes 12 and 13 until avalanche breakdown voltage of emitter junction $J_{E2}$ is reached corresponding to voltage represented by abscissa 20 on the graph of FIGURE 2.

Assume that an increasing voltage is applied between electrodes 12 and 13 to render electrode 12 increasingly negative with respect to electrode 13. With such voltage applied, junctions $J_{E1}$ and $J_{E2}$ become forward biased and junction $J_C$ becomes reversely biased. At low currents emitter junction $J_{E1}$ is practically inoperative as an emitter because of the shorting of regions 5 and 6 by electrode 12. As the voltage across the device increases, only a small saturation current flows representing reverse current across junction $J_C$, shown as ordinate 21 on graph of FIGURE 2. As the voltage approaches the avalanche voltage $V_{BO}$ of the collector junction $J_C$, the current flow across junction $J_C$ represented by arrows 22 in FIGURE 1 is parallel to the emitter junction $J_{E1}$ toward the surface 7 and increases rapidly. The resulting voltage drop produced by this current flow in region 5 along junction $J_{E1}$ forward biases $J_{E1}$, with the largest bias occurring at the right-hand edge of the junction farthest from the shorting contact point 11. The effective emitter efficiency, and hence alpha, increases rapidly with increased current flow. When the current reaches a level $I_s$, referred to as a turn-on current, at which the low voltage alpha sum of the NPN and PNP transistor sections of the device is greater than unity, the device switches to the low voltage state and to a voltage corresponding to abscissa 23 on the graph of FIGURE 2. The transition is very abrupt for the reason that as the voltage across collector junction $J_C$ drops, the current originally distributed over the entire region 5 now shifts mainly to the edge of region 6 remote from portion 10 and the current density becomes very high. If the sum of the low voltage alphas is less than one, even after the current has shifted to the edge of emitter region 6, partial switching occurs and the voltage across the device drops to an intermediate value where the alpha sum including multiplication is unity. The device will switch to the low voltage state at a still higher current level at which the alpha sum requirement is met. Once the switch is on, sufficient biasing of base region 5 must still be maintained to hold the emitter in strong forward bias. Since $J_C$ is now in forward bias, avalanche effects at $J_C$ no longer are significant in maintaining conduction of the device.

Figure 2:
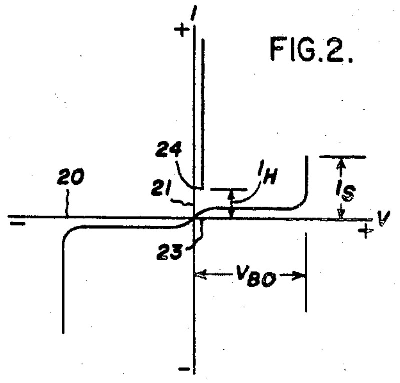
FIGURE 2 is a graph of the current versus voltage characteristic of the device of FIGURE 1.

Assuming that only the emitter edge at the right is active, i.e. operation near the switch point, a minimum value for the hold current $I_H$ as shown in FIGURE 2 is given by dividing the emitter bias voltage $V_{we}$ required for efficient injection by the total resistance of the base region from emitter edge to the shorted junction, thus $I_H \geqq V_{we} L (R_s W_e)^{-1}$. To produce forward conduction in P=N junction devices, it is necessary to apply a small forward incremental voltage before conduction is obtained across the junction. This parameter, represented by $V_{we}$, varies for materials, and in the case of silicon materials, is of the order of .5 to .8 of a volt. L is the length of the contact parallel to the shorted junction, $$R_s = \frac{P_B}{t}$$

is the sheet resistance of the P-type base, $P_B$ is the average base resistivity, $t$ is the base width and $W_e$ is the width of the emitter contact. It is assumed that conductivity modulation due to minority carriers can be neglected.

When external circuit requirements are such that the current $I_H$ in FIGURE 2 is less than the minimum value necessary to maintain the device in conduction as represented by ordinate 24, the device ceases to conduct and reverts to its nonconductive state. In the region of heavy forward conduction most of the emitter is biased into conduction and the device exhibits the low A-C impedance characteristic of conventional PNPN switch devices. With respect to the characteristics shown in FIGURE 2, it has been found possible to vary the value of the switch-on current $I_s$ to be greater than, equal to, or less than the hold current $I_H$.

The device shown in FIGURE 1 may be constructed by any of a variety of techniques. In one such technique, diffusion is used to form the various regions of the device. A body of silicon semiconductor material of N-type conductivity having a resistivity of 3 ohm centimeters with dimensions approximately 100 mils square and 15 mils thick (a mil is one-thousandth of an inch) is the starting material. The surface of the body corresponding to surface 7 of FIGURE 1 is oxidized at high temperatures by exposure to a stream of steam. Surface 8 may be protected from oxidation or subsequent to oxidation thereof is ground and lapped or etched to remove the oxide layer. The resultant body is then placed in an evacuated sealed quartz tube with an alloy source consisting of silicon, gallium and phosphorus. The temperature of the body is raised to about 1150° C. to 1250° C. and the temperature of the source is raised to 1000° C. to 1200° C. Gallium from the source diffuses through the oxide layers as well as the exposed surfaces on the body to form the P-type region 4 and the P-type region 5. Phosphorus, being incapable of diffusing through the oxide layer, diffuses through only the unprotected surface 8 of the silicon body, converting P-type silicon into N-type. It should be noted that as gallium diffuses at a faster rate than phosphorus, two regions are produced in the body, a P-type region in advance of an N-type region. The concentrations of gallium and phosphorus in the alloy source are controlled so that the phosphorus is able to produce N-type conductivity in previously converted P-type conductivity material. Diffusion is allowed to proceed for a time sufficient to produce the desired depths of penetration. The surfaces 12 and 18 and sides of the body 2 are then ground and etched, or just etched, to remove the oxide layers. A conductive coating of gold is evaporated on surfaces 7 and 8 to form electrode 12, and a conductive coating of aluminum is evaporated on the external surface 18 to form electrode 13. Conductive coatings of other metals such as nickel and lead, for example, may be applied in place of those mentioned by any of a number of techniques well known in the art. To these contacts conductors 16 and 17 are suitably bonded. While in this example material of specific resistivity and dimensions was mentioned, devices utilizing semiconductor materials of considerably higher and lower resistivities as well as devices of different dimensions have been successfully made. Devices passing a few milliamps to many amperes in the forward direction have also been made.

Figure 3:
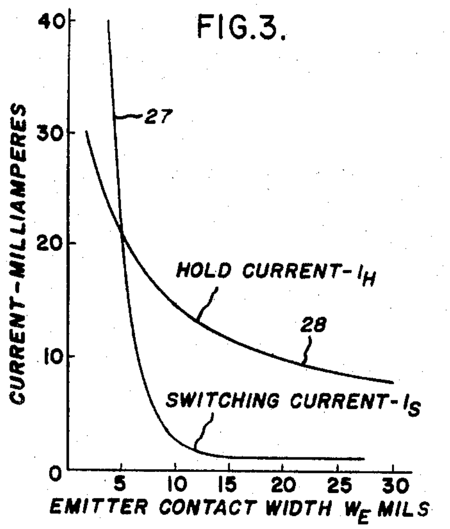
FIGURE 3 shows graphs of the switching current and hold current as a function of the emitter contact width for a specific device of the kind shown in FIGURE 1.
Figure 4:
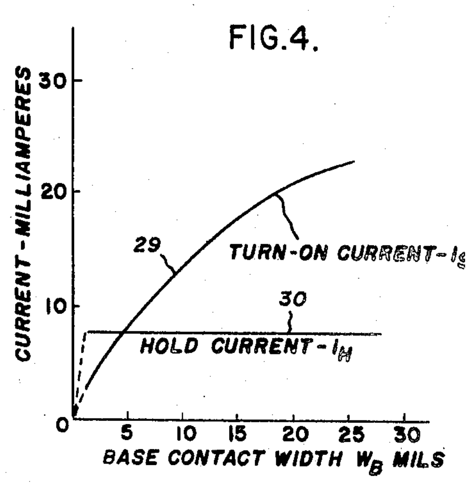
FIGURE 4 shows a graph of the hold current and the turn-on current as a function of base contact width for a specific device of the kind shown in FIGURE 1.
Figure 5:
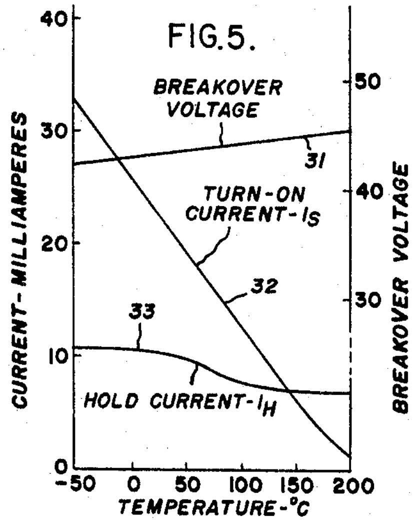
FIGURE 5 shows the variation of break-over voltage, turn-on current, and hold current as a function of the temperature for a specific device of the kind shown in FIGURE 1.

In FIGURES 3, 4 and 5 are shown graphs of various characteristics of specific devices of the kind shown in FIGURE 1. The devices of these figures were made in accordance with the technique described. The device of FIGURE 3 had the initial dimensions: L=19 mils, $W=W_E+W_B=38$ mils, where L=length of body 2 perpendicular to the plane of the drawing and W=width of the body in the plane of the drawing made up of a component $W_E$ lying on surface 8 and a component $W_B$ lying on surface 7. Region 3 was of 0.1 ohm centimeters resistivity. The device of FIGURE 4 had the dimensions: L=26 mils, $W_E+W_B=41$ mils, respectively. The device used to obtain the daat of FIGURE 5 had a circular contact 12 of 18 mils diameter, with a portion of its diameter corresponding to $W_B$ and a larger portion of its diameter corresponding to $W_E$.

In FIGURE 3 is shown the variation of switching or turn-on current $I_s$ and the hold current $I_H$ as a function of emitter contact width $W_E$ for a device having base contact width $W_B$ of 8.5 mils and length of 19 mils. Graph 27 shows the variation of turn-on current and graph 28 shows the variation of hold current.

In graphs 29 and 30 of FIGURE 4 are shown the variation of turn-on curent and hold current with the base contact width $W_B$. The hold current $I_H$ generally is unaffected by variation in base contact width. The turn-on current increases roughly linearly with base contact width.

Shorted emitter switches, unlike conventional PNPN switches, are capable of operation over an extensive temperature range. FIGURE 5 shows characteristics on a device which was operated over the temperature range of −50° C. to +200° C. Graphs 31, 32 and 33 of FIGURE 5 show the variation of break-over voltage, turn-on current and hold current, respectively, as a function of temperature. Break-over voltage $V_{BO}$ is the voltage corresponding to the current $I_s$ at which turn-on occurs. The hold current $I_H$ changes only moderately over an extensive temperature range whereas the turn-on current $I_s$ changes appreciably. The break-over voltage, in accord with the small temperature coefficient of avalanche breakdown, is relatively constant.

In conventional PNPN diodes, switching (or partial switching) generally begins at such low currents that a moderate temperature increase, and the associated increase either in bulk or surface leakage currents, may lead to a marked decrease in the break-over voltage $V_{BO}$. Shorted emitter switching structures are less susceptible to this effect as they may be designed, as is readily apparent from the foregoing description of the structure and operation of an embodiment of the present invention, for much higher turn-on currents.

Due to the low currents at which conventional PNPN diodes turn on, fast pulses and the associated charging currents will switch on the device before the pulses have attained a magnitude corresponding to the rated break-over voltage. Shorted emitter switching structures are free of this difficulty since turn-on currents may readily be designed to be considerably greater than the capacitive charging current of a fast pulse.

Figure 6:
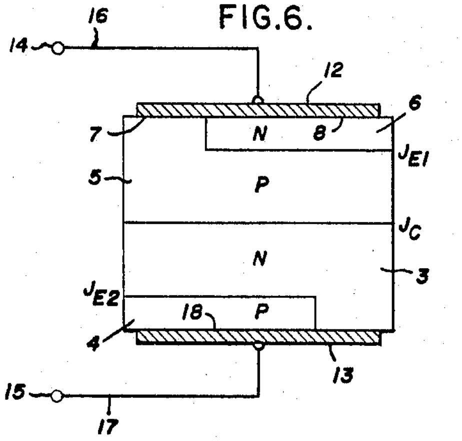
FIGURE 6 shows a sectional view of another embodiment of a four-layer switching device in accordance with the present invention.
Figure 7:
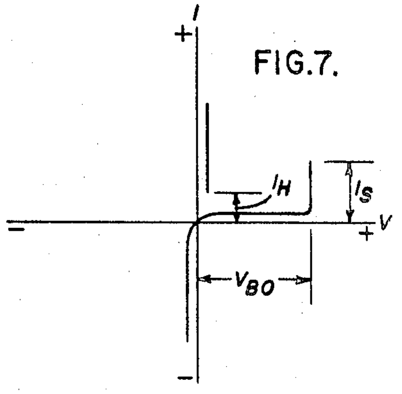
FIGURE 7 shows a graph of current versus voltage for the device of FIGURE 7.

FIGURE 6 shows a cross-sectional view of a two-electrode switching device having the voltage-current characteristic depicted in FIGURE 7. The device of FIGURE 6 is similar to the device of FIGURE 1 and corresponding elements have hte same designations. The device of FIGURE 6 differs from the device of FIGURE 1, however, in that in FIGURE 6 the P-type region 4 extends only part way along the width of the electrode 13. The remainder of electrode 13 contacts the N-type region 3 which extends outward similarly to P-type region 5. Thus, P–N junction $J_{E2}$ has a portion parallel and a portion perpendicular to electrode 13.

The device of FIGURE 6 is formed in the manner similar to the manner of formation of the device of FIGURE 1 with the exception of the formation of the junction $J_{E2}$. A semiconductor wafer 2, such as shown in FIGURE 1, is formed as described above. The external P-type layer of the resultant wafer corresponding to region 4 of FIGURE 1 is then removed by grinding and etching. The entire wafer is then oxidized and from that portion of surface 18 which it is desired to be P-type the oxide is removed. The wafer is then subjected to a stream of boron chloride ($BCL_3$) or boron oxide ($B_2O_3$) at a temperature and for a sufficient time to produce the desired depth of conversion of the unoxidized portion of the N-type region into P-type conductivity. The surfaces 7, 8 and 18, and sides of the wafer are then ground and etched, or just etched, to remove the oxide layers. Electrodes 12 and 13 are then applied as in connection with the device of FIGURE 1.

In the graph of FIGURE 7 is shown the voltage-current characteristics of this device. When electrode 12 is biased negatively with respect to electrode 13, it is obvious that the device behaves as the device of FIGURE 1 since junctions $J_{E1}$ and $J_{E2}$ are forwardly biased and junction $J_C$ is reversely biased and in addition $J_{E2}$ is an operative shorted emitter just as $J_{E1}$. The characteristic of the device is shown in the first quadrant of the graph. When electrode 12 is biased positively with respect to electrode 13, P-type region 5, which is conductively connected to electrode 12, becomes positive with respect to N-type region 3, which is conductively connected to electrode 13. Thus the device has the low impedance characteristic of a forward biased P-N junction shown in the third quadrant of this figure.

Figure 8:
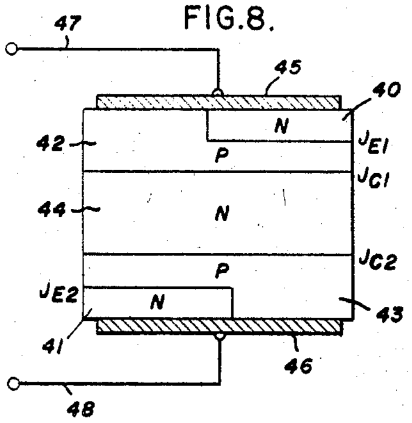
FIGURE 8 shows a sectional view of a five-layer two-electrode device in accordance with the present invention.
Figure 9:
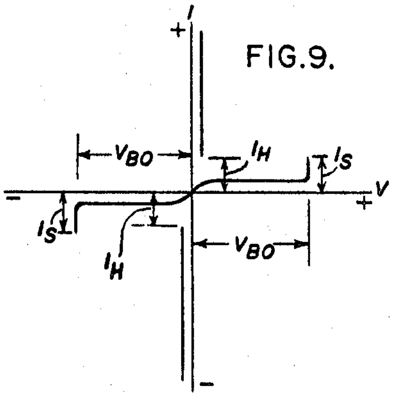
FIGURE 9 shows a grarph of the current versus voltage characteristics of the device of FIGURE 8.

FIGURE 8 shows a cross-sectional view of a two-electrode switching device having the voltage-current characteristic depicted in FIGURE 9. The device of FIGURE 8 has five layers, 40, 41, 42, 43 and 44, each layer being of a conductivity type opposite to the conductivity type of an adjacent layer. The end layers 40 and 41 are of the same conductivity type (N-type) and foreshortened in width with the adjacent intermediate layers 42 and 43, presenting an extended surface lying in the same plane as the external surface of layers 40 and 41. Electrodes 45 and 46 make conductive contact with the external surfaces of the semiconductor body from which the device is formed. Leads 47 and 48 are connected to electrodes 45 and 46, respectively. Thus, there are formed in the device four P-N junctions, $J_{E1}$, $J_{E2}$, $J_{C1}$, $J_{C2}$. $J_{E1}$ is formed between N and P layers 40 and 42, respectively. $J_{E2}$ is formed between N and P layers 41 and 43, respectively. $J_{C1}$ is formed between P and N layers 42 and 44, respectively. $J_{C2}$ is formed between P and N layers 43 and 44, respectively.

The device of FIGURE 8 is formed in a manner similar to the manner of formation of the device of FIGURE 1. The surface of the body of FIGURE 8 is oxidized by exposure to a stream of steam at high temperature. A portion of the upper surface of the semiconductor body and also a portion of the lower surface of the semiconductor body is protected from oxidation or subsequent to oxidation thereof is ground and lapped or etched to remove the oxide layer. The process is otherwise the same as described in connection with the device of FIGURE 1. Those parts of the upper and lower surfaces which are protected become P-type in conductivity as in the device of FIGURE 1. Of course, diffusion is allowed to proceed for a time sufficient to produce the configuration desired as shown in the figure. The upper and lower surfaces and sides of the semiconductor body of FIGURE 8 are then ground and etched to remove the oxide layers. Conductive coatings are applied to the external upper and lower surfaces to form electrodes 45 and 46.

In FIGURE 9 is shown a graph of the current versus voltage characteristics of the device of FIGURE 8. The device of FIGURE 8 is characterized as a five-region symmetrical switch having two shorted emitters which switches either polarity of voltage applied across its terminals. The operation of the device of FIGURE 8 will be explained in conjunction with the graph of FIGURE 9. Assume that the voltage applied to electrode 47 is negative with respect to the voltage applied to 48. Junction $J_{E1}$ acts as an operative shorted emitter. Junction $J_{C1}$ acts as a collector, that is, the collector which is to switch. Junction $J_{C2}$ acts as the other emitter and junction $J_{E2}$ would tend to be in the reverse bias but because of the short circuit due to electrode 46, cannot sustain any voltage. The device in the assumed polarity switches just as does the device of FIGURE 1 and has the characteristic shown in the first quadrant of the graph. If now the applied voltage is reversed in polarity, it is obvious from the symmetry of this structure that again switching occurs and has the characteristic shown in the third quadrant of the figure. In a conventional NPNPN or PNPNP device, switching also occurs but one or the other emitter junction is reverely biased so as to pass current only at the avalanche voltage of that junction. Thus a large series voltage drop in the forward direction is characteristic of such devices whereas the structure of FIGURE 8 has the low forward voltage characteristic of PNPN devices.

Figure 10:
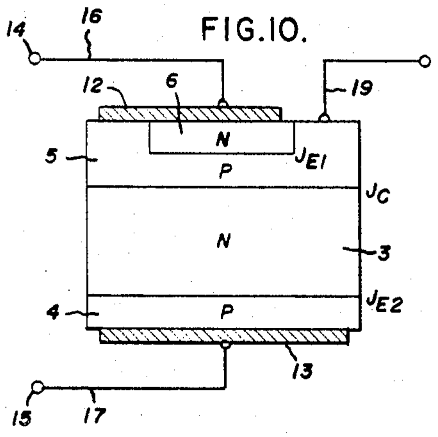
FIGURE 10 shows a sectional view of a four-layer three-electrode device of switch-like characteristics in accordance with the present invention.

In FIGURE 10 is shown a four-layer three-electrode switch-type device. This device is similar to the device of FIGURE 1 and corresponding elements are denoted by the same designations. Intermediate layer 5 extends out to the top surface of the device on a side of the junction $J_{E1}$ which is remote from the part of $J_{E1}$ which is short circuited, and an ohmic control electrode 19 is connected thereto. The device of FIGURE 10 may be fabricated by techniques similar to the techniques used in the fabrication of the device of FIGURE 1.

Figure 11:
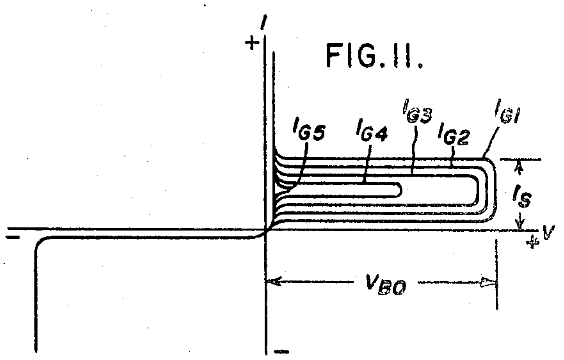
FIGURE 11 is an idealized graph of the current versus voltage characteristics of the device of FIGURE 10.

FIGURE 11 shows the forward and reverse current versus voltage characteristics of the device. The device of FIGURE 10 functions in a manner similar to the manner of functioning of the device of FIGURE 1. In general, the characteristics in the first and third quadrants are very similar to the characteristics of the device of FIGURE 1. The family of graphs labeled $I_{G1}$, $I_{G2}$, $I_{G3}$, $I_{G4}$, $I_{G5}$, show the current versus voltage characteristics for increasing values of control current $I_G$ applied at electrode 19. The increased injection from region 6 into 5 is obtained by appropriately biasing electrode 19 with respect to electrode 14 to permit layer 6 to function as an emitter. Increased bias across electrode 19 with respect to electrode 14 independently increases injection at the edge of emitter 6 nearest electrode 19, thus permitting the two conditions referred to above to be met at lower values of voltage applied across the load current carrying electrodes 12 and 13.

Figure 12:
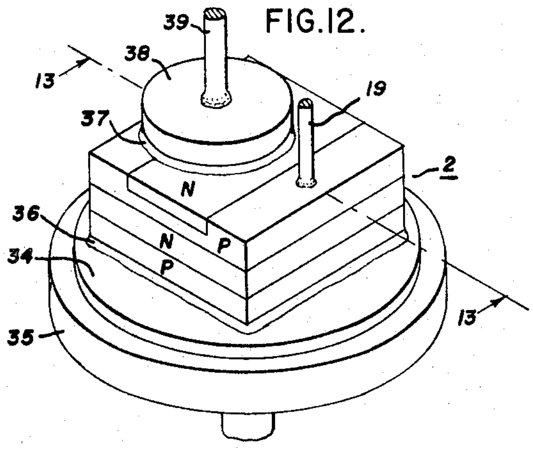
FIGURE 12 shows a perspective view of one structural form which the device of FIGURE 10 may take.
Figure 13:
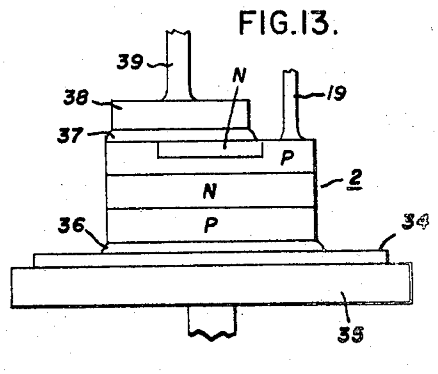
FIGURE 13 is a sectional view along section 13—13 of the device of FIGURE 12.

FIGURES 12 and 13 show further constructional features of the device ef FIGURE 10. Body 2 is shown mounted on a conductive plate 34 which may be tungsten or other suitable material which in turn is soldered to mounting conductor 35. The electrode 36 may conveniently be a deposit of aluminum. Similarly, the conductor 37 may be a deposit of aluminum and conductor 38 may be tungsten or other suitable material to which external conductor 39 is soldered. Control conductor 19 may be aluminum wire alloyed to the P-type region, or other suitable material. The constructional features shown in FIGURES 12 and 13 may be utilized in the other embodiments described above and to be described in the remainder of this specification.

Figure 14:
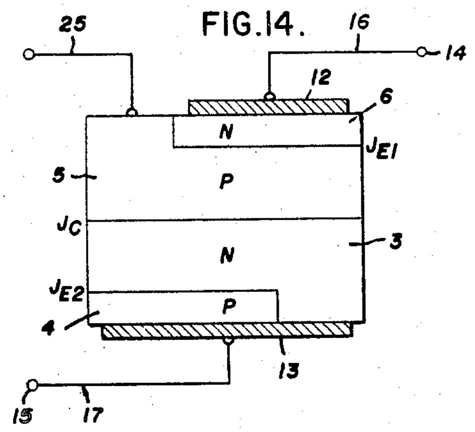
FIGURE 14 shows a sectional view of another embodiment of a three-electrode four-layer device of switch-like characteristics in accordance with the present invention.

In FIGURE 14 is shown a four-layer three-electrode switch-type device. This device is similar to the device of FIGURE 6 and corresponding elements are denoted by the same designations. However, in this device the upper electrode 12 makes contact only with layer 6 and a control electrode 25 is conductively connected to P-type base layer 5. This device may be fabricated in accordance with the techniques of fabrication described above.

Figure 15:
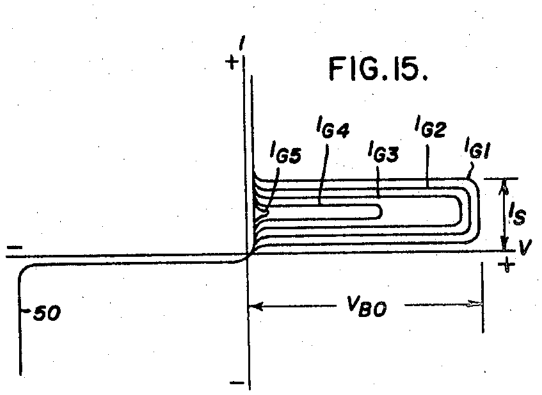
FIGURE 15 shows an idealized graph of the current versus voltage characteristics of the device of FIGURE 14.

In FIGURE 15 are shown the forward and reverse current versus voltage characteristics of the device of FIGURE 14. When electrode 12 is positive with respect to electrode 13, the device has the reverse characteristic indicated at 50, the breakdown voltage being determined by the breakdown voltage of $J_{E1}$. When electrode 12 is negative with respect to electrode 13, the device has the forward characteristics indicated in the family of graphs in the first quadrant, i.e. similar to the characteristics of a conventional controlled rectifier. The graphs labeled $I_{G1}$–$I_{G5}$ show the current versus voltage characteristic for varying values of current $I_G$ applied at control electrode 25.

Figure 16:
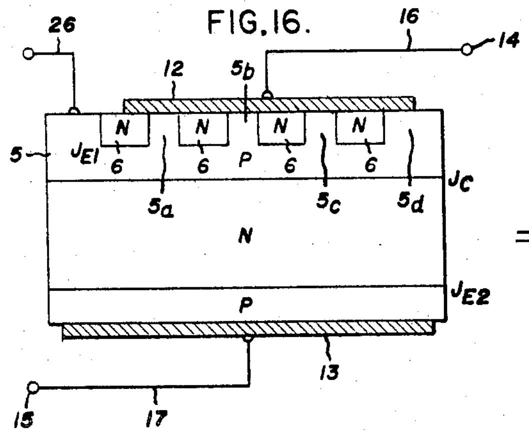
FIGURE 16 shows a sectional view of still another embodiment of a three-electrode four-layer switch-like device in accordance with the present invention.

In FIGURE 16 is shown a four-layer, three-electrode switch-type device. This device is similar to the device of FIGURE 1 and corresponding elements are denoted by the same designations. In this device intermediate layer 5 extends out to the top surface of the device through emitter region 6 in a plurality of P-type conductivity regions *5a*, *5b*, *5c* and *5d* which may be local regions. Electrode 12 makes contact to region 6 and to regions *5a*, *5b*, *5c* and *5d*. Electrode 26 is connected to region 5 at a point remote from the part of junction $J_{E1}$ which is short circuited. This device may be fabricated in accordance with the manner of fabrication of the device of FIGURE 1. The surface adjacent regions desired to be P-type may be oxide masked as explained in connection with FIGURE 1, thus inhibiting penetration of those regions with the N-type diffusant used to produce the configuration shown. As an alternative, a P-type activator such as indium or gallium may be alloyed in spots through the region 6 of FIGURE 1 to the P-type region 5 before attachment of ohmic contact 12. A structure such as shown in FIGURE 14 in which the shorts are distributed has the usual advantages of shorted emitter structures, while not requiring larger injection currents to be applied at the control electrode 26 to render the device conductive, everything else being the same.

Figure 17:
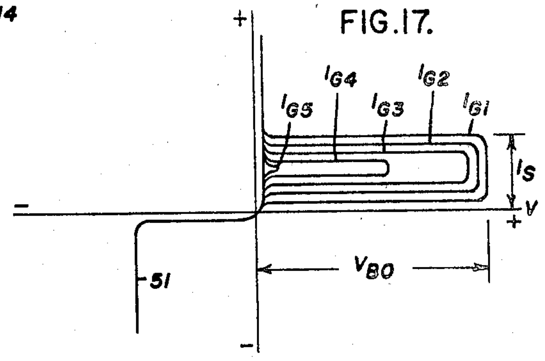
FIGURE 17 shows an idealized graph of the current versus voltage characteristic of the device of FIGURE 16.

In FIGURE 17 are shown the forward and reverse current versus voltage characteristics of the device of FIGURE 16. When electrode 12 is positive with respect to electrode 13, the device has the reverse characteristics indicated at 51. When electrode 12 is negative with respect to electrode 13, the device has the forward characteristics shown in the family of graphs in the first quadrant. The graphs labeled $I_{G1}$–$I_{G5}$ show the current versus voltage characteristics for increasing values of control current $I_G$ applied at electrode 26.

Figure 18:
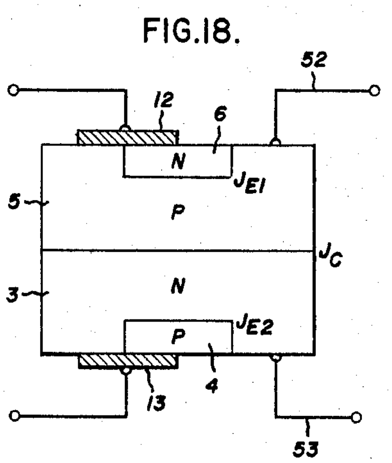
FIGURE 18 shows a sectional view of a multi-electrode four-layer switch-like device in accordance with the present invention.

In FIGURE 18 is shown a four-layer multi-electrode switch-type device. The device is similar to the device of FIGURE 6 and corresponding elements are denoted by the same designations. In this device intermediate layer 5 extends out to the top surface of the device on both sides of N-region 6. Similarly, intermediate N-type layer 3 extends out to the bottom surface of the device on both sides of the P-region 4. Shorting contacts 12 and 13 are applied as in FIGURE 6. In addition, control electrodes 52 and 53 are applied on the bases 5 and 3, respectively, on that side remote from the short. The position of the short may be shifted from the right hand side of the device to the left hand side and the control electrode correspondingly shifted.

Figure 19:
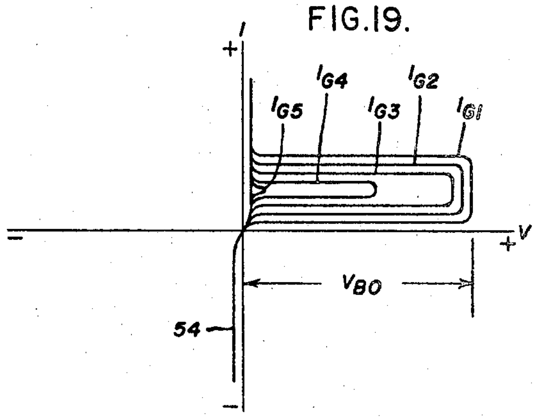
FIGURE 19 shows an idealized graph of the current versus voltage characteristics of the device of FIGURE 18.

In FIGURE 19 are shown the voltage versus current characteristics of the device of FIGURE 16. When electrode 12 is positive with respect to electrode 13, the junction $J_C$ becomes forward biased as shown in portion 54 of the graph of FIGURE 19. When electrode 12 is negatively biased with respect to electrode 13, the forward characteristics are as shown in the family of graphs in the first quadrant. These graphs show the current versus voltage characteristic for various values of current $I_{G1}$–$I_{G5}$ applied at electrode 52. A similar family of characteristics exist for various currents applied at electrode 53. Also, the conduction of current from electrode to electrode may be simultaneously determined by currents applied to both electrodes 52 and 53.

Figure 20:
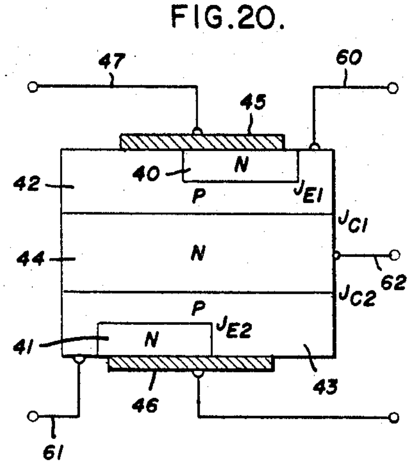
FIGURE 20 shows a sectional view of a five-layer device in accordance with the present invention employing more than two electrodes.

In FIGURE 20 is shown a five-layer switch-type device similar to the device of FIGURE 8 having control electrodes connected to various intermediate layers of the device. Elements of the device of FIGURE 20 corresponding to the elements of the device of FIGURE 8 are denoted by the same designations. The end layers or regions 40 and 41 do not extend to the edges of the semiconductor body, thereby permitting intermediate layers 42 and 43 to extend to the upper and lower surfaces of the device, respectively. At the ends of junctions $J_{E1}$ and $J_{E2}$ remote from the ends which are shorted are included portions which extend perpendicularly to the upper and lower surfaces of the device. At the external surfaces 42 and 43 adjacent these portions of junctions $J_{E1}$ and $J_{E2}$ electrodes 60 and 61 are, respectively, connected. In addition, a control electrode 62 is connected to the center layer 44. It will be appreciated that the structure shown in FIGURE 18 can be fabricated by techniques similar to the techniques for fabrication of the device of FIGURE 8.

Figure 21:
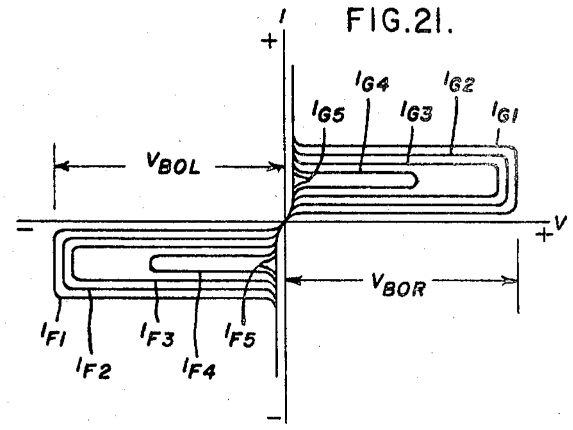
FIGURE 21 shows an idealized graph of the current versus voltage characteristics of the device of FIGURE 20.

In FIGURE 21 are shown the current versus voltage characteristics of the device of FIGURE 20. It will be appreciated that the device of FIGURE 20, in the absence of control signals applied to the control electrodes thereof, behaves very similarly to the device of FIGURE 8. That is, when electrode 45 is polarized negatively with respect to electrode 46, the device will become conductive at a particular value of voltage $V_{BOR}$ and similarly, when electrode 45 is positively polarized with respect to electrode 46, the device will become conductive at another particular value of voltage $V_{BOL}$ as shown in FIGURE 21. The family of graphs $I_{G1}$–$I_{G5}$ and $I_{F1}$–$I_{F5}$ show the variation of the current versus voltage characteristic across electrodes 45, 46 of the device for various values of control current applied at control electrodes 60 and 61, respectively. For increasing values of control current, the device switches to the forward conduction condition at lower values of voltage applied between electrodes 45, 46. It is apparent that families of characteristics similar to the families of characteristics shown for control electrodes 60 and 61 exist in each of the first and third quadrants for various currents applied at the electrode 62.

As mentioned previously, the criteria for breakdown in forward conduction of the junction $J_{C1}$ in one case, and $J_{C2}$ in the other case, is that the current gain of at least one of the two transistor sections into which the device is resolvable in the forward conduction condition have an alpha which increases with current and also that the sum of the alphas of the two-transistor sections at some intermediate current be equal to or greater than unity. These conditions for firing for a particular voltage applied across the main current carrying electrodes 45 and 46 can be fulfilled by the application of suitable currents to control electrodes 60 and 61. Of course, a signal on one of the control electrodes 60 and 61 would have an effect only when the main electrodes are appropriately polarized. The firing of the device, that is, the switching from the high resistance condition to the low resistance condition may be obtained regardless of the polarity of electrode 45 with respect to electrode 46 by the injection of signal at electrode 62. When the current applied at this electrode is such that for a given voltage applied across the electrodes 45 and 46, the conditions set forth above are fulfilled, the device fires. Of course, the switching of the device to the conductive state can also be accomplished by simultaneous application of control currents to two or more of control electrodes 60, 61 and 62.

The device of FIGURE 20 may be used in circuits where conventional four-layer three-electrode control devices, commonly referred to as controlled rectifiers, are used as well as in other circuits which make full utilization of the bi-directional switching characteristics of the device as well as the multiplicity of control elements.

The two-electrode devices disclosed above may be used in circuits and ways in which conventional multilayer PNPN switching devices are used, for example, in crosspoint switching, in telephone switchboard applications, in oscillators, counting circuits and in circuits requiring negative resistance characteristics as well as in circuits and uses yet to be devised. The three or more electrode devices disclosed above may be used in circuits in which the conventional controlled rectifiers are used as well as in circuits yet to be devised.

While the various devices have in large part been shown as fabricated by diffusion techniques, it will be understood that other techniques and combination of techniques may be used to form the structures described.

While the invention has been shown and described in connection with particular embodiments of the invention, it will be apparent to those skilled in the art that changes and modifications may be made without departing from the invention in its broader aspects. For example, while the devices have been generally illustrated in rectilinear geometries, it will be understood that circular, cylindrical and other geometries may be used. It will be also understood that the "shorted emitter" structures disclosed may be combined with other structures and the various junctions and regions may be warped rather than planar to achieve novel effects. It is, therefore, intended that the appended claims cover all such changes and modifications as fall within the true spirit and scope of the invention.

What we claim as new and desire to secure by Letters Patent of the United States is:

1. A semiconductor device comprising a body of semiconductor material having a pair of opposed surfaces and including a plurality of regions therebetween, said regions being of one and the opposite conductivity type, adjacent regions being of different conductivity types and forming a plurality of P-N junctions, a pair of electrodes each in conductive contact with a respective one of said opposed surfaces of said body, one of said junctions adjacent one of said surfaces meeting in said one surface and spanned by one of said electrodes.

2. A semiconductor device comprising a body of semiconductor material containing a region of one conductivity type having therein a surface adjacent region of the opposite conductivity type to form therewith a P-N junction, an electrode in low resistance ohmic contact with the surfaces of said regions adjacent said junction, a third region of said opposite conductivity type forming with said one region a second P-N junction, said regions forming a junction transistor with said second P-N junction acting as the collector P-N junction thereof, a fourth region of said one conductivity type forming with said third region a third P-N junction, said fourth, third and said one region forming a junction transistor with said second P-N junction acting as the collector P-N junction thereof, another electrode in conductive contact with an external surface of said fourth region.

3. A semiconductor device comprising a body of semiconductor material including four layers of one and the opposite conductivity type, layers of one conductivity type being interleaved with layers of the opposite conductivity type forming a plurality of P-N junctions therein, an electrode in low resistance ohmic contact with a surface of an external layer of said body and an exposed surface of an adjacent intermediate layer, and another electrode in low resistance ohmic contact with a surface of the other external layer of said body.

4. A semiconductor device comprising a body of semiconductor material including four layers of one and the opposite conductivity type, layers of one conductivity type being interleaved with layers of the opposite conductivity type forming a plurality of P-N junctions therein, an electrode in low resistance ohmic contact with a surface of an external layer of said body and an exposed surface of an adjacent intermediate layer, and another electrode in low resistance ohmic contact with a surface of the other external layer of said body, and a third electrode connected to one of said intermediate layers.

5. A semiconductor device comprising a body of semiconductor material including four layers of one and the opposite conductivity type, layers of one conductivity type being interleaved with layers of the opposite conductivity type forming a plurality of P-N junctions therein, an electrode in low resistance ohmic contact with a surface of an external layer of said body and an exposed surface of an adjacent intermediate layer, and another electrode in low resistance ohmic contact with a surface of the other external layer of said body, and a third electrode connected to said one adjacent intermediate layer at a point conductively remote from said one electrode.

6. A semiconductor device comprising a body of semiconductor material including four layers of one and the opposite conductivity type, layers of one conductivity type being interleaved with layers of the opposite conductivity type forming a plurality of P-N junctions therein, an electrode in low resistance ohmic contact with a surface of an external layer of said body and an exposed surface of an adjacent intermediate layer, and another electrode in low resistance ohmic contact with a surface of the other external layer of said body, and an exposed surface of an adjacent intermediate layer.

7. A semiconductor device comprising a body of semiconductor material including four layers of one and the opposite conductivity type, layers of one conductivity type being interleaved with layers of the opposite conductivity type forming a plurality of P-N junctions therein, an electrode in low resistance ohmic contact with a surface of an external layer of said body and an exposed surface of an adjacent intermediate layer, and another electrode in low resistance ohmic contact with a surface of the other external layer of said body and an exposed surface of an adjacent intermediate layer, and a third electrode connected to one adjacent intermediate layer at a point conductively remote from said one electrode.

8. A semiconductor device comprising a body of semiconductor material including four layers of one and the opposite conductivity type, layers of one conductivity type being interleaved with layers of the opposite conductivity type forming a plurality of P-N junctions therein, an electrode in low resistance ohmic contact with a surface of an external layer of said body and an exposed surface of an adjacent intermediate layer, and another electrode in low resistance ohmic contact with a surface of the other external layer of said body and an exposed surface of an adjacent intermediate layer, a third electrode connected to one said adjacent intermediate layer at a point conductively remote from said one electrode, and a fourth electrode connected to the other said adjacent intermediate layer at a point conductively remote from said other electrode.

9. A semiconductor device comprising a body of semiconductor material including four layers of one and the opposite conductivity type, layers of one conductivity type being interleaved with layers of the opposite conductivity type forming a plurality of P-N junctions therein, an electrode in low resistance ohmic contact with a surface of an external layer of said body and an exposed surface of an adjacent intermediate layer, said intermediate layer conductively contacting said electrode at spaced areas thereon, and another electrode in low resistance ohmic contact with a surface of the other external layer of said body, and a third electrode connected to said one external layer at a point conductively remote from said one electrode.

10. A semiconductor device comprising a body of semiconductor material including five layers of one and the opposite conductivity type, layers of one conductivity type being interleaved with layers of the opposite conductivity type forming a plurality of P-N junctions therein, an electrode in low resistance ohmic contact with a surface of an external layer of said body and an exposed surface of an adjacent intermediate layer, and another electrode in low resistance ohmic contact with a surface of the other external layer of said body and an exposed surface of an adjacent intermediate layer.

11. A semiconductor device comprising a body of semiconductor material including five layers of one and the opposite conductivity type, layers of one conductivity type being interleaved with layers of the opposite conductivity type forming a plurality of P-N junctions therein, an electrode in low resistance ohmic contact with a surface of an external layer of said body and an exposed surface of an adjacent intermediate layer, and another electrode in low resistance ohmic contact with a surface of the other external layer of said body and an exposed surface of an adjacent intermediate layer, and a third electrode connected to one of said intermediate layers.

12. A semiconductor device comprising a body of semiconductor material including five layers of one and the opposite conductivity type, layers of one conductivity type being interleaved with layers of the opposite conductivity type forming a plurality of P-N junctions therein, an electrode in low resistance ohmic contact with a surface of an external layer of said body and an exposed surface of an adjacent intermediate layer, and another electrode in low resistance ohmic contact with a surface of the other external layer of said body and an exposed surface of an adjacent intermediate layer, and a third electrode connected to one of said intermediate layers adjacent an external layer at a point conductively remote from the electrode connected to said external layer.

13. An improved P-N-P-N transistor switching device comprising a monocrystalline body of semiconducting material having selected impurities therein defining four zones of P-N-P-N polarity arrangement, at least three adjacent transistor zones of said transistor having a high current gain, and at least two ohmic contacts engaging said body with at least one thereof in electrical connection to both a P and an N zone thereof at one end of said transistor body for electrically shorting the transistor junction therebetween whereby the application of an increasing voltage across said transistor of such polarity as to reverse bias the central transistor junction thereof produces only a low current conduction therethrough to the point of reverse voltage breakdown of said central transistor junction whereat current flowing through said transistor zones produces a forward biasing of the electrically shorted transistor junction to cause conduction through all four transistor zones with a consequent substantial increase in the total current gain thereof.

14. The switching device as described in claim 3 further defined by having a second and a third ohmic contact in addition to said one contact which engages both a P and an N zone in one end of said body, said second contact solely engaging the zone adjacent to said central transistor junction not engaged by said one contact and adapted for connection to a source control voltage for varying the point at which the reverse voltage breakdown of said central transistor junction occurs, said third contact engaging the other zone not otherwise engaging a contact.

15. An improved P-N-P-N semiconductor switching device comprising a semiconductor body of four zones of alternately different conductivity types with at least one end zone being inset into the next adjacent zone to define a surface common to both zones such that said end zones is substantially surrounded upon said surface by the next adjacent zone, and at least two ohmic contacts engaging said body with one thereof electrically contacting substantially all of said common surface to engage both zones thereat, said contacts being adapted for connection to a variable power supply whereby a transistor junction between the two zones at said common surface is only forward biased by current flow through the zone next adjacent the end zone.

16. An improved P-N-P-N switching device as described in claim 6 further defined by both ends of said body having a surface common to the end zone thereat and the next adjacent zone thereto, and said ohmic contacts substantially covering each of said common surfaces to thereby each engage an end zone and next adjacent zone whereby only a central transistor junction between central zones is not electrically shorted by electrical contacts.

17. A symmetrical switching device comprising a semiconductor body having at least four alternating regions of opposite conductivity separated by rectifying barrier zones, said regions being arranged in a composite configuration equivalent to a pair of oppositely poled diodes with each of said diodes having at least one of said alternating regions in common, respective terminal conductors connecting adjacent opositely conductive regions of the body to effectively connect said diodes in parallel, whereby to provide symmetrical switching action for both halves of an alternating current voltage wave applied to the device.

18. A symmetrical switching device comprising a semiconductor wafer having a plurality of alternating regions of opposite conductive material thereon separated by rectifying barrier zones, the wafer having at least two adjacent regions of opposite conductivity at each end and the regions being arranged to define a pair of oppositely poled four-layer diodes terminating at the ends of the wafer, respective terminal conductors connecting two adjacent regions at the ends of the wafer, whereby to connect the diodes in parallel.

19. A symmetrical switching device comprising a semiconductor wafer having at least three alternating regions of oppositely conductive material thereon separated by rectifying barrier zones, whereby the wafer has end regions of the same conductivity, each end region being provided with at least one relatively limited region of opposite conductivity with a rectifying barrier zone between the limited regions and end regions, respective terminal conductors connecting the limited regions to the adjacent end regions, whereby to define a pair of oppositely poled diodes connected in parallel.

20. A symmetrical switching device comprising a semiconductor body having a plurality of alternating regions of opposite conductivity separated by rectifying barrier zones, said regions being arranged in a composite configuration equivalent to a pair of oppositely poled diodes, respective terminal conductors connecting adjacent oppositely conductive regions of the body to effectively connect said diodes in parallel, whereby to provide symmetrical switching action for both halves of an alternating current voltage wave applied to the device, and means providing relatively high internal resistivity in the body between the connections of said terminal conductors thereto, whereby the device is relatively sensitive to the rate of change of the voltage applied thereto.

References Cited

UNITED STATES PATENTS

| | | | |
|---|---|---|---|
| 2,561,411 | 7/1951 | Pfann | 317—235 |
| 2,597,028 | 5/1952 | Pfann | 317—235 |
| 2,667,607 | 1/1954 | Robinson | 317—234 |
| 2,725,315 | 11/1955 | Fuller | 317—234 |
| 2,847,623 | 8/1958 | Thornhill | 317—234 |
| 2,875,505 | 3/1959 | Pfann | 317—239 |
| 2,913,676 | 11/1959 | Pankove | 317—235 |
| 2,918,628 | 12/1959 | Stuetzer | 317—235 |
| 3,015,048 | 12/1961 | Noyce | 317—235 |
| 3,015,762 | 1/1962 | Shockley | 317—234 |

JAMES D. KALLAM, Primary Examiner

U.S. Cl. X.R.

317—234